US00RE48096E

(19) United States
(12) Reissued Patent
Carman

(10) Patent Number: US RE48,096 E
(45) Date of Reissued Patent: Jul. 14, 2020

(54) REUSABLE BOX BLANK

(71) Applicant: INTEPLAST GROUP CORPORATION, Livingston, NJ (US)

(72) Inventor: Gregory A. Carman, Victoria, TX (US)

(73) Assignee: Inteplast Group Corporation, Livingston, NJ (US)

(21) Appl. No.: 15/830,674

(22) Filed: Dec. 4, 2017

Related U.S. Patent Documents

Reissue of:
(64) Patent No.: 9,290,290
Issued: Mar. 22, 2016
Appl. No.: 14/196,388
Filed: Mar. 4, 2014

(51) Int. Cl.

| | |
|---|---|
| ***B65D 5/30*** | (2006.01) |
| ***B65D 5/02*** | (2006.01) |
| ***B65D 5/10*** | (2006.01) |
| ***B65D 5/00*** | (2006.01) |
| ***B65D 5/42*** | (2006.01) |

(52) U.S. Cl.
CPC ..... *B65D 5/0254* (2013.01); *B65D 5/003* (2013.01); *B65D 5/106* (2013.01); *B65D 5/30* (2013.01); *B65D 5/304* (2013.01); *B65D 5/305* (2013.01); *B65D 5/4295* (2013.01)

(58) Field of Classification Search
CPC ..... B65D 5/0254; B65D 5/30; B65D 5/106
USPC ..... 229/174, 178, 198.2
See application file for complete search history.

(56) References Cited

U.S. PATENT DOCUMENTS

| | | | | | |
|---|---|---|---|---|---|
| 697,668 | A | | 4/1902 | Schleicher | |
| 2,167,917 | A | | 8/1939 | Vogt | |
| 3,034,697 | A | * | 5/1962 | Frankenstein | 229/167 |
| 3,608,811 | A | | 9/1971 | Frick | |
| 3,869,079 | A | | 3/1975 | Oglesbee | |
| 4,017,019 | A | * | 4/1977 | Booth | B65D 5/106 229/113 |
| 4,262,582 | A | | 4/1981 | Sugimoto et al. | |
| 4,561,587 | A | | 12/1985 | Wysocki | |
| 4,830,270 | A | | 5/1989 | Holmes | |
| 4,883,221 | A | * | 11/1989 | Brundage | 229/143 |
| 5,163,609 | A | * | 11/1992 | Muise, Jr. | B65D 5/003 229/113 |
| 5,467,916 | A | | 11/1995 | Beales | |
| 5,755,376 | A | * | 5/1998 | Greer | B65D 5/0209 220/615 |
| 7,467,743 | B1 | * | 12/2008 | Philips | 229/169 |
| 7,470,226 | B1 | | 12/2008 | Herrin | |

(Continued)

*Primary Examiner* — Beverly M Flanagan
(74) *Attorney, Agent, or Firm* — Stinson LLP

(57) ABSTRACT

A blank for being repeatably assembled into a box configuration without the use of adhesives. The blank has a bottom panel, a side panel foldably attached to the bottom panel, an end panel foldably attached to the bottom panel, and a locking structure configured to secure the side panel and the end panel in respective orthogonal positions with respect to the bottom panel. The locking structure includes an overlay panel foldably attached to the end panel and foldable toward an overlying position in which it overlies a portion of the side panel. The locking structure also includes a slot in the bottom panel, a flap foldably attached to the bottom panel and extending into the slot, and a tab foldably attached to the overlay panel for being lockingly received in the slot to secure the overlay panel in the overlying position.

31 Claims, 14 Drawing Sheets

(56) References Cited

U.S. PATENT DOCUMENTS

| | | | | |
|---|---|---|---|---|
| 8,091,770 | B2 * | 1/2012 | McLeod | B65D 5/003 229/143 |
| 8,205,787 | B2 | 6/2012 | Panduro, Jr. et al. | |
| 9,290,290 | B2 | 3/2016 | Carman | |
| 2007/0170234 | A1 | 7/2007 | Cargile, Jr. | |
| 2014/0008262 | A1 * | 1/2014 | Whittles | B65D 5/10 206/503 |

* cited by examiner

REUSABLE BOX BLANK

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

FIELD OF INVENTION

The present invention generally relates to a blank for being assembled into a box shape. More particularly, the present invention relates to a reusable blank for being repeatedly assembled into a box configuration without the use of adhesives.

BACKGROUND

Boxes are commonly used to contain various items for storage and transport, but their three-dimensional structure is inconvenient when the box is empty. Empty boxes can be difficult to store, and treating boxes as disposable (i.e., discarding them after each use) can be uneconomical. Thus, it is desirable to have boxes that can be reusably disassembled from their three-dimensional box configurations for easy storage.

Many boxes are initially assembled from a one-piece slab 20 of material (broadly, a "blank"). Adhesives are commonly used to secure panels of a blank in respective positions to assemble a box structure. Though adhesives may be sufficiently strong to secure some blanks in respective box configurations, they do not permit easy disassembly without damaging the blank.

For improved reusability, some box blanks have used interlocking structural features to secure the panels of the blank in a box configuration. However, these box blanks suffer from various limitations. For example, in some cases the interlocking structural features provide insufficient strength to hold the blank in the box configuration under the strain of the static and dynamic forces of the items contained in the box in use. Likewise, in some cases, the very use of the interlocking structural features causes damage thereto, rendering the blank incapable of reuse after disassembly.

One example of an interlocking structural feature that suffers from these limitations is a dart-type lock. Dart-type locks typically include an opening (e.g., in the side wall of a box) and a corresponding dart tab configured to be lockingly received in the opening. The dart tab typically has a widthwise span that is slightly wider than the width of the opening. The widthwise span of a typical dart tab is oriented substantially orthogonal to the longitudinal axis of the dart panel. As the name suggests, the front edge of a dart tab is tapered to a point. A force is applied generally in the direction of the longitudinal axis of the dart tab to insert the dart tab into the opening. As the front edge (i.e., the point) of the dart tab is inserted further into the opening the widthwise span is increasingly compressed by the constraints of the narrower opening. Though the dart tab may show some widthwise resilience once it is received in the opening (e.g., the widthwise span may return to a width wider than that of the opening), the act of insertion tends to damage the dart tab. Likewise, the act of pulling the dart tab out of the opening tends to inflict additional damage to the dart tab. The damage inflicted by inserting and removing the dart tab through the opening can permanently deform the dart tab such that its widthwise span becomes permanently narrower than the width of the opening. When this occurs, the dart-type lock becomes inoperable. As a result, dart-type locks are not well-suited for frequent reuse as an interlocking structure.

Accordingly, a box blank with improved reusability is desired.

SUMMARY

In one aspect, the present invention includes a blank for being repeatably assembled into a box configuration without the use of adhesives. The blank has a bottom panel, a side panel foldably attached to the bottom panel, an end panel foldably attached to the bottom panel, and a locking structure configured to secure the side panel and the end panel in respective orthogonal positions with respect to the bottom panel. The locking structure includes an overlay panel foldably attached to the end panel. The overlay panel is configured to be folded toward an overlying position in which the overlay panel overlies a portion of the side panel when the side panel and the end panel are in the respective orthogonal positions. The locking structure includes a slot in the bottom panel, a flap foldably attached to the bottom panel and extending into the slot, and a tab foldably attached to the overlay panel for being lockingly received in the slot to secure the overlay panel in the overlying position. The tab has a spine and a pair of wings extending outwardly from the spine. Each of the wings is configured to bend away from the bottom panel from a coplanar position with respect to the spine as the tab is being inserted in the slot. Each of the wings is further configured to resiliently return toward its respective coplanar position when the tab is received in the slot.

In another aspect of the invention, a reusable box may be secured in a box configuration without the use of adhesives. The box has a bottom panel, a pair of side panels foldably attached to opposite sides of the bottom panel and oriented in respective orthogonal positions with respect to the bottom panel, and a pair of end panels foldably attached to opposite ends of the bottom panel and oriented in respective orthogonal positions with respect to the bottom panel. Each of the end panels abut each of the side panels at four respective corners of the box. A locking structure for each of the four corners of the box secures a respective one of the side panels and a respective one of the end panels in its respective orthogonal position with respect to the bottom panel. Each locking structure includes for said respective one of the side panels and said respective one of the end panels an overlay panel foldably attached to said respective one of the end panels in an overlying position in which the overlay panel overlies a portion of said respective one of the side panels. Each locking structure also includes a slot in the bottom panel, a flap foldably attached to the bottom panel and extending into the slot, and a tab lockingly received in the slot to secure the overlay panel in the overlying position. The tab has a spine and a pair of wings extending outwardly from the spine. The tab is configured to be inserted in the slot such that each of the wings bends away from the bottom panel from a coplanar position with respect to the spine as the tab is being inserted in the slot. Each of the wings is configured to resiliently return toward its respective coplanar position when the tab is received in the slot.

In another aspect of the invention, a locking structure is configured to secure first, second, and third panels of a box in respective orthogonal positions with respect to one another without using adhesives. The locking structure includes an overlay panel foldably attached to the first panel. The overlay panel is configured to be folded toward an overlying position in which the overlay panel overlies a portion of the second panel. The locking structure has a slot in the third panel, a flap foldably attached to the third panel and extending into the slot, and a tab foldably attached to the overlay panel at a tab joint. The tab is configured to be inserted in the slot and received therein to secure the overlay panel in the overlying position. The tab has a spine and a pair of wings extending outwardly from the spine. The tab is further configured to fold along the tab joint from a position coplanar with the overlay panel as the tab is being inserted in the slot. Each of the pair of wings is configured to bend away from the third panel from a coplanar position with respect to the spine as the tab is being inserted in the slot. Each of the pair of wings is further configured to resiliently return toward its respective coplanar position when the tab is received in the slot. When the tab is received in the slot, the tab joint is in substantial coplanar alignment with the third panel.

In another aspect of the invention, a method of reusing a blank securable in a box configuration without the use of adhesives includes the following steps: (a) providing one-piece slab of material having a bottom panel, a side panel foldably attached to the bottom panel, an end panel foldably attached to the bottom panel, and a locking structure, the locking structure including an overlay panel foldably attached to the end panel, a slot in the bottom panel, a flap foldably attached to the bottom panel and extending into the slot, and a tab foldably attached to the overlay panel and comprising a spine and a pair of wings extending outwardly from the spine; (b) folding the side panel to an orthogonal position with respect to the bottom panel; (c) folding the end panel to an orthogonal position with respect to the bottom panel; (d) folding the overlay panel to an overlying position in which the overlay panel overlies a portion of the side panel; (e) inserting the tab into the slot such that the tab is lockingly received in the slot, each of the wings bending away from the bottom panel from a coplanar position with respect to the spine during said inserting; (f) pushing the tab out from the slot toward a coplanar position with respect to the overlay panel; (g) folding the overlay panel, the end panel, and the side panel toward a coplanar position with respect to the bottom panel; and (h) repeating at least steps (b) through (e).

Other aspects of the present invention will be apparent in view of the following description and claims.

BRIEF DESCRIPTION OF THE DRAWINGS

FIG. 11 is the perspective view of FIG. 1, with the box blank configured with the side panels folded up and the corner panels folded in;

Corresponding reference characters indicate corresponding parts throughout the drawings.

DETAILED DESCRIPTION OF THE DRAWINGS

Figure 1:
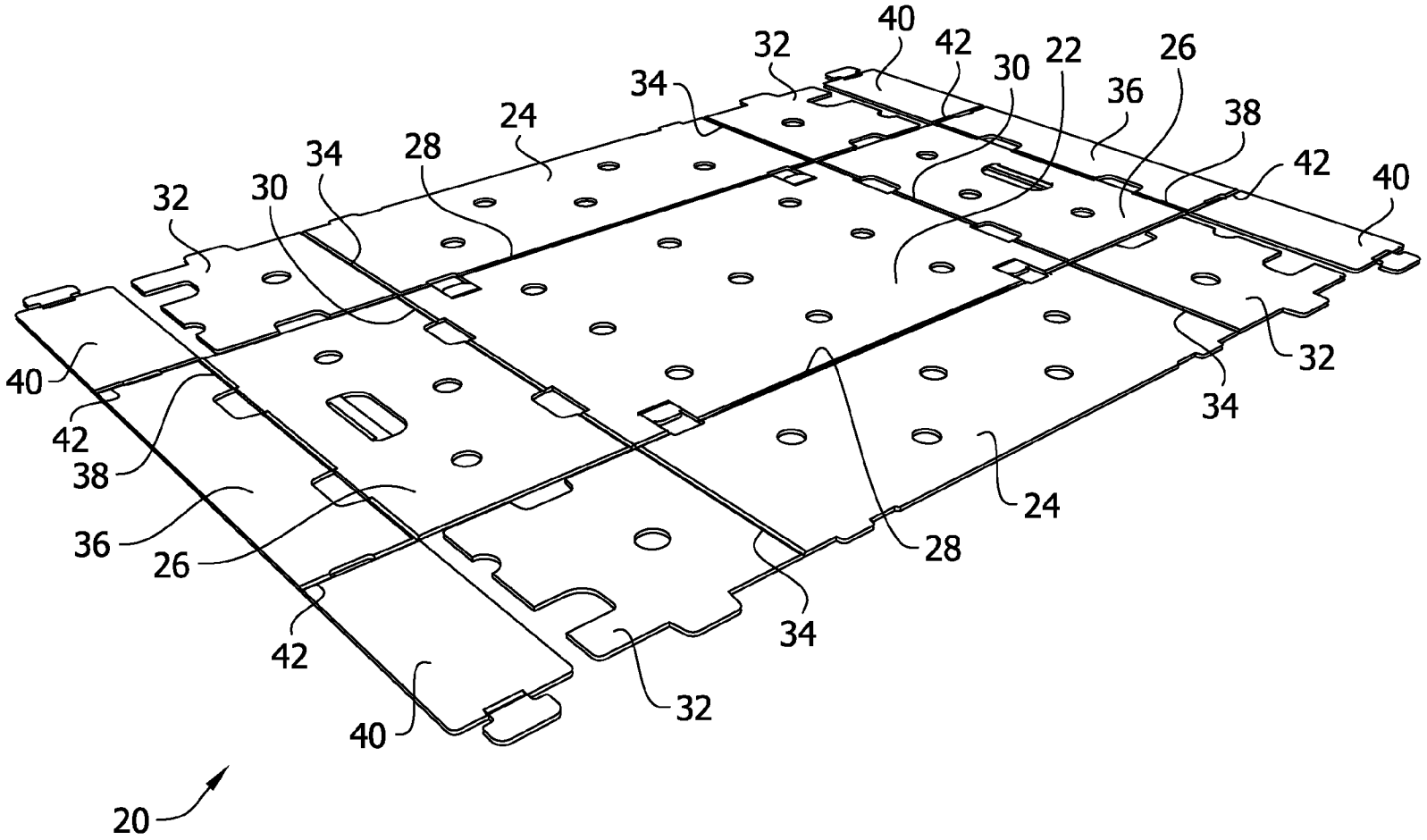
FIG. 1 is a perspective view of an exemplary reusable box blank of the present invention, shown in a planar configuration.

Referring to FIG. 1, a reusable box blank of the present invention is designated in its entirety by the reference number 20. The blank 20 is shown as a one-piece slab of generally planar material that includes a plurality of foldably attached panels, though multi-piece assemblies (e.g., an assembly of separate, hingedly connected panels) may also be used without departing from the scope of the invention. The blank 20 has a bottom panel 22, a pair of side panels 24, and a pair of end panels 26. As used throughout the present disclosure, the term "side" should be understood broadly to include features that may be positioned or otherwise oriented at the front, back, right, or left of a related feature. So, for example, in the illustrated embodiment, the side panels 24 may be the front and back panels of the blank 20 in use or they may be the right and left panels. In the illustrated embodiment, the side panels 24 extend outward from the bottom panel 22 in opposite directions to define a sidewise span of the blank 20. The end panels 26 extend outward from the bottom panel 22 in opposite directions to define a portion of an endwise span of the blank 20. The sidewise span of the blank 20 is oriented substantially orthogonally to the endwise span.

Each of the side panels 24 is foldably attached to the bottom panel 22 at a respective bottom side joint 28. Each end panel 26 is foldably attached to the bottom panel 22 at a bottom end joint 30. In a preferred embodiment, the one-piece blank 20 is modified (e.g., scored) so that it folds more compliantly along the bottom side joints 28 and bottom end joints 30 than along a non jointed line of the blank. For example, in the illustrated embodiment, the blank 20 is perforated along the bottom side joints 28 and compressed along the bottom end joints 30. Other modifications may also be used to improve the folding compliance of the bottom side joints 28 and bottom end joints 30 without departing from the scope of the invention. Moreover, the one-piece blank 20 may be unmodified at its joints without departing from the scope of the invention.

Four corner panels 32 extend outwardly from the ends of the side panels 24. Each corner panel 32 is foldably attached to a respective side panel 24 at a corner panel joint 34. Top panels 36 extend outwardly from the end panels 26 and are foldably attached thereto at top edge joints 38. Overlay panels 40, the use of which will be discussed in greater detail below, extend outwardly from sides of each top panel 36. Each of the overlay panels 40 is foldably attached to a side of a top panel 36 at a top overlay joint 42. In the illustrated embodiment, the blank 20 is compressed along each of the corner panel joints 34, top edge joints 38, and top overlay joints 42. Though, as above, alternative joint constructions may also be used without departing from the scope of the invention.

In FIG. 1, the blank 20 is shown in a planar configuration. In the planar configuration, each of the various panels 22, 24, 26, 32, 36, and 40 lies generally in the same plane. The blank 20 lies generally in a single plane. In suitable embodiments, the blank 20 may have a thickness of from about 1 mm to about 10 mm, preferably from about 2 mm to about 6 mm. when in the planar configuration. The planar configuration may be suitable for convenient storage of the blank 20 when not in use as a box. In such a configuration, the storage volume consumed by the blank 20 is minimized If many blanks 20 are to be stored at the same time, they may be stacked, one on top of the other, or arranged otherwise in parallel to one another for space-efficient organization.

Figure 2:
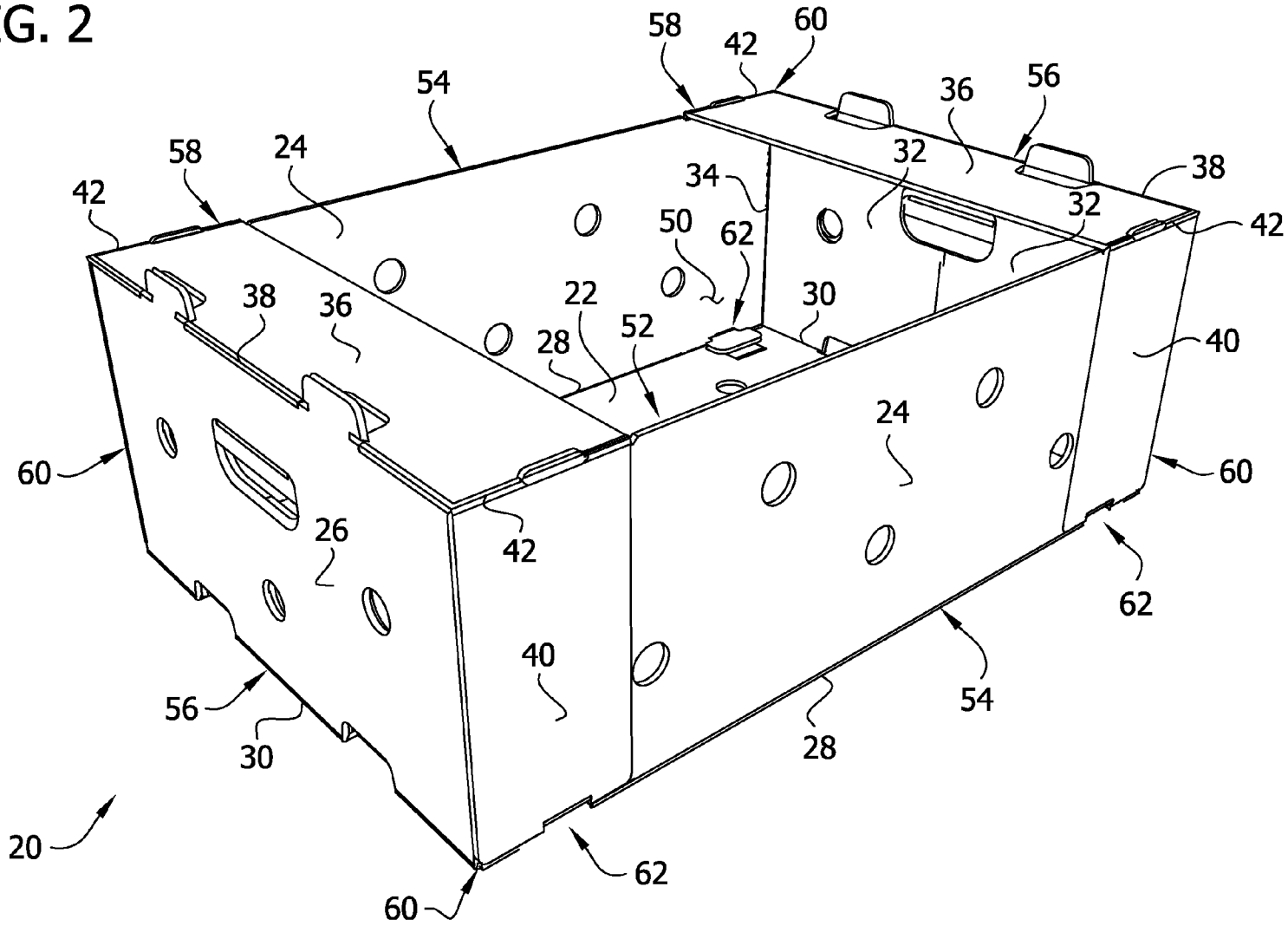
FIG. 2 is the perspective view of FIG. 1, with the box blank being shown in a box configuration.

As shown in FIG. 2, the blank 20 may be secured in a box configuration. In the box configuration, the blank 20 defines a storage space 50 suitable for at least partially surrounding and containing items for storage or transport. The storage space 50 is bounded by a bottom wall 52, opposite side walls 54, opposite end walls 56, and top portions 58. Each of the side walls 54 abuts each of the end walls 56 at one of four corners 60. In the illustrated embodiment, the bottom wall 52 includes the bottom panel 22, each of the side walls 54 includes a respective side panel 24, and each of the end walls 56 includes a respective end panel 26. The top panels 36 define top portions 58.

The pair of side panels 24 are oriented in respective orthogonal positions with respect to the bottom panel 22. The side panels 24 lie in parallel planes spaced apart from one another along the width W of the bottom panel 24. Each side panel 24 extends upwardly from the respective bottom side joint 28. The pair of end panels 26 are oriented in respective orthogonal positions with respect to the bottom panel 22. The respective orthogonal positions of the end panels 26 are oriented at a substantially right angle with respect to the respective orthogonal positions of the side panels 24. The end panels 26 lie in parallel planes spaced apart from one another along the length L of the bottom panel 22. The parallel planes of the end panels 26 intersect the parallel planes of the side panels 24 at a substantially orthogonal angles. Each end panel 26 extends upwardly from the respective bottom end joint 30. In the illustrated embodiment, each of the side panels 24 and end panels 26 extend upwardly from a respective joint 28, 30 the same height H from the bottom panel 22. It should be understood that, though the illustrated embodiment depicts a blank 20 suitable for forming into a generally rectilinear box shape, other box shapes may also be used without departing from the scope of the invention.

The end panels 26 abut the side panels 24 at the four respective corners 60. Each of the corners 60 has an associated locking structure (discussed in more detail below), generally indicated at 62, that secures a respective one of the side panels 24 and a respective one of the end panels 26 in its respective orthogonal position with respect to the bottom panel 22 without using adhesives. In the illustrated embodiment, the top panels 36 extend inward from the top edge joints 38 to define the top portions 58. The top panels 36 are oriented generally parallel to the bottom panel 22 when the blank 20 is in the box configuration. As will be discussed in more detail below, the overlay panels 40 each extend downward from the top overlay joints 42 to an overlying position in which each overlies a portion of a side panel 24. By way of the top panels 36 (e.g., at top edge joint 38 and top overlay joint 42), each of the overlay panels 40 is foldably attached to a respective end panel 26.

In the illustrated embodiment, the corner panels 32 are folded in from the corner panel joints 34. The corner panels 32 may, for example, be folded toward a ninety-degree angle with respect to the side panels 24 such that the bottom edge of each corner panel rests on the bottom panel 22 immediately adjacent a respective portion of a bottom end joint 30. Respective pairs of the illustrated corner panels 32 extend substantially across the width W of the box blank 20. However, the corner panels 36 may extend different lengths without departing from the scope of the invention. In some embodiments, the corner panels 32 are arranged to prevent the side panels 24 from over-rotating when they are folded up from the planar configuration of FIG. 1. When a corner panel 32 is folded in along the corner panel joint 34, the respective side panel 24 may be prevented from rotating past an orthogonal position with respect to the bottom panel 22. Each end panel 26 overlies respective pairs of corner panels 32 when the blank 20 is in the box configuration and prevents the corner panels from resiliently returning toward a position coplanar with the side panels 24. As will be discussed in more detail below, the locking structures 62 prevent the side panels 24 and the end panels 26 from resiliently returning toward respective planar positions with respect to the bottom panel 22.

As discussed above, the top panels 36 are folded down from the top edge joints 38. In this position, the top panels 36 are supported by a top edge of respective corner panels 32. Likewise, the top panels 36 are supported by a portion of the top edge of each of the side panels 24. These top edge portions of the side panels 24 prevent the top panels 36 from over-rotating when folded down from their respective top edge joints 38. Because the end panels 26 are foldably attached to respective top panels 36, they are likewise prevented from over-rotating when folded up from their respective bottom end joints 30. When a top panel 36 is folded in from its top edge joint 38, the end panel 26 may be prevented from rotating past an orthogonal position with respect to the bottom panel 22. As will be discussed in more detail below, each top panel 36 is prevented from resiliently returning toward a coplanar position with respect to its respective end panel 26 and each end panel is prevented from resiliently returning to a coplanar position with respect to the bottom panel 22 by at least one locking structure 62.

As will be discussed in more detail below, each overlay panel 40 may be a component of a locking structure 62. Each overlay panel 40 may be folded down from a top overlay joint 42 toward an overlying position in which it overlies a portion of a side panel 24. In the illustrated embodiment, each overlay panel 40 is oriented substantially orthogonally to the respective top panel 36 when in the overlying position. Each locking structure 62 may be configured to prevent an overlay panel 40 from resiliently returning toward a position coplanar with a respective top panel 36. The secured overlay panel 40 in turn prevents the respective top panel 36 from resiliently returning toward a position coplanar with its respective end panel 26 and prevents the overlaid side panel 24 from resiliently returning toward a position coplanar with the bottom panel 22. The secured top panel 36 in turn prevents its attached end panel 26 from resiliently returning toward a position coplanar with the bottom panel 22, which prevents the respective pair of corner panels 32 from resiliently returning toward coplanar positions with respect to their side panels 24. Thus, in a broad sense, the respective locking structures 62 may be used to securely gird the blank 20 in the box configuration of FIG. 2.

As shown best in FIGS. 3-7, each locking structure 62 may be used to secure one side panel 24 and one end panel 26 in their respective orthogonal positions with respect to the bottom panel 22. It will be understood by those skilled in the art, that FIGS. 3-7 present views of one corner 60 and one corresponding locking structure 62. However, this one locking structure 62 may be used to secure the end panels 26 and side panels 24 in their respective orthogonal positions with respect to the bottom panel 22 at any of the four corners 60. Locking structures 62 may also be used to secure the end panels 26 and side panels 24 in their respective orthogonal positions at less than four of the corners 60 without departing from the scope of the invention.

Figure 3:
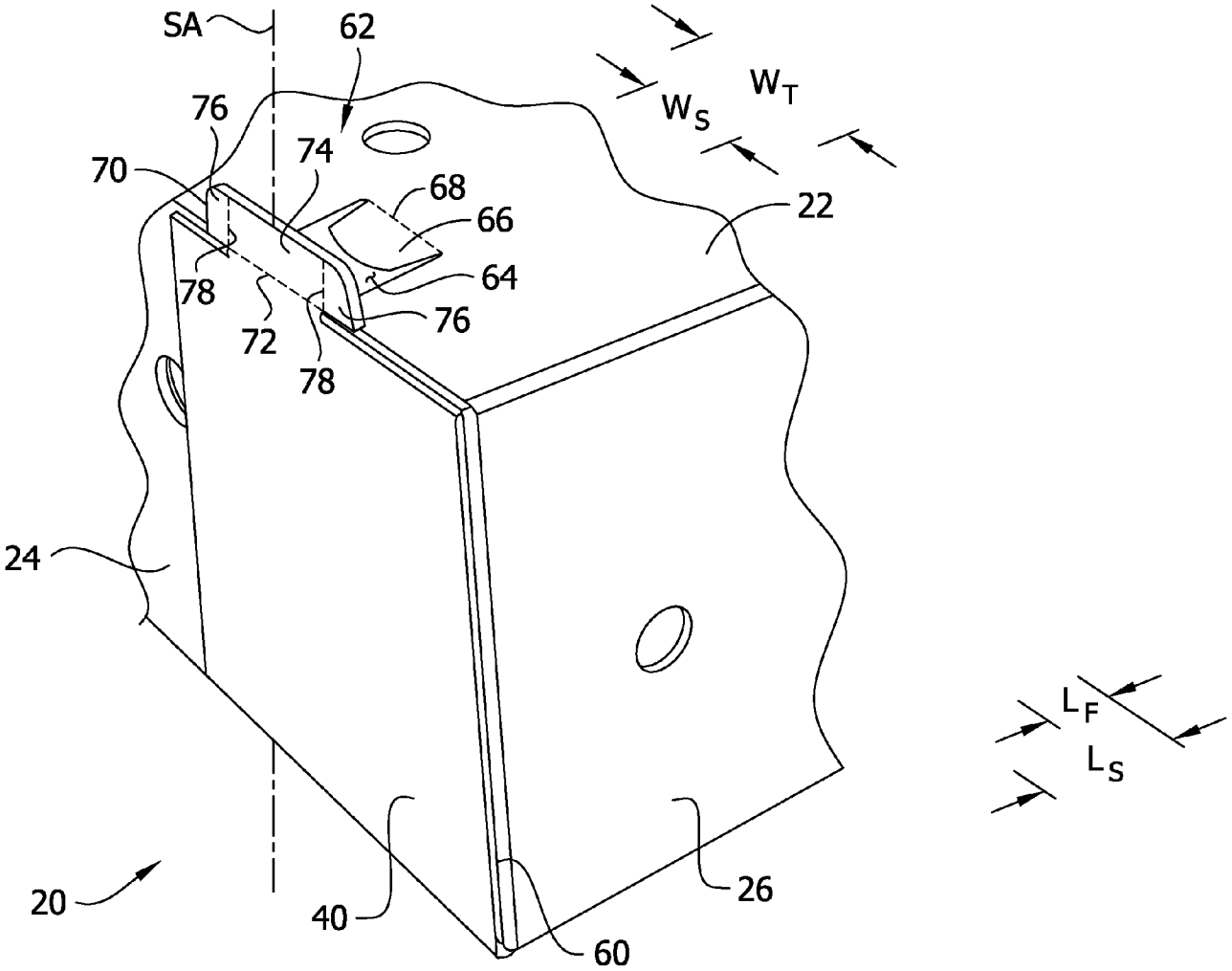
FIG. 3 is a fragmentary, inward-facing, underside perspective view of a locking structure of the box blank, with the tab in a coplanar orientation with respect to the overlay panel.
Figure 4:
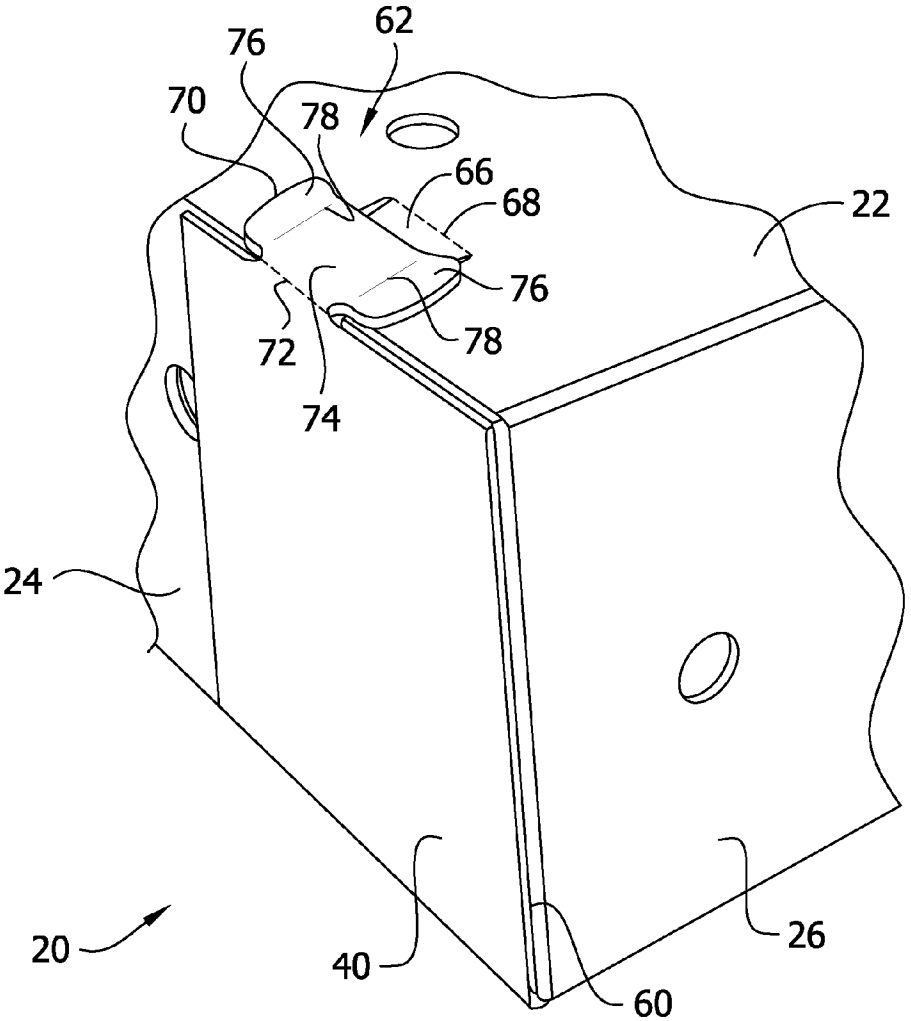
FIG. 4 is the fragmentary, inward-facing, underside perspective view of FIG. 3, with the tab being inserted in the slot.
Figure 5:
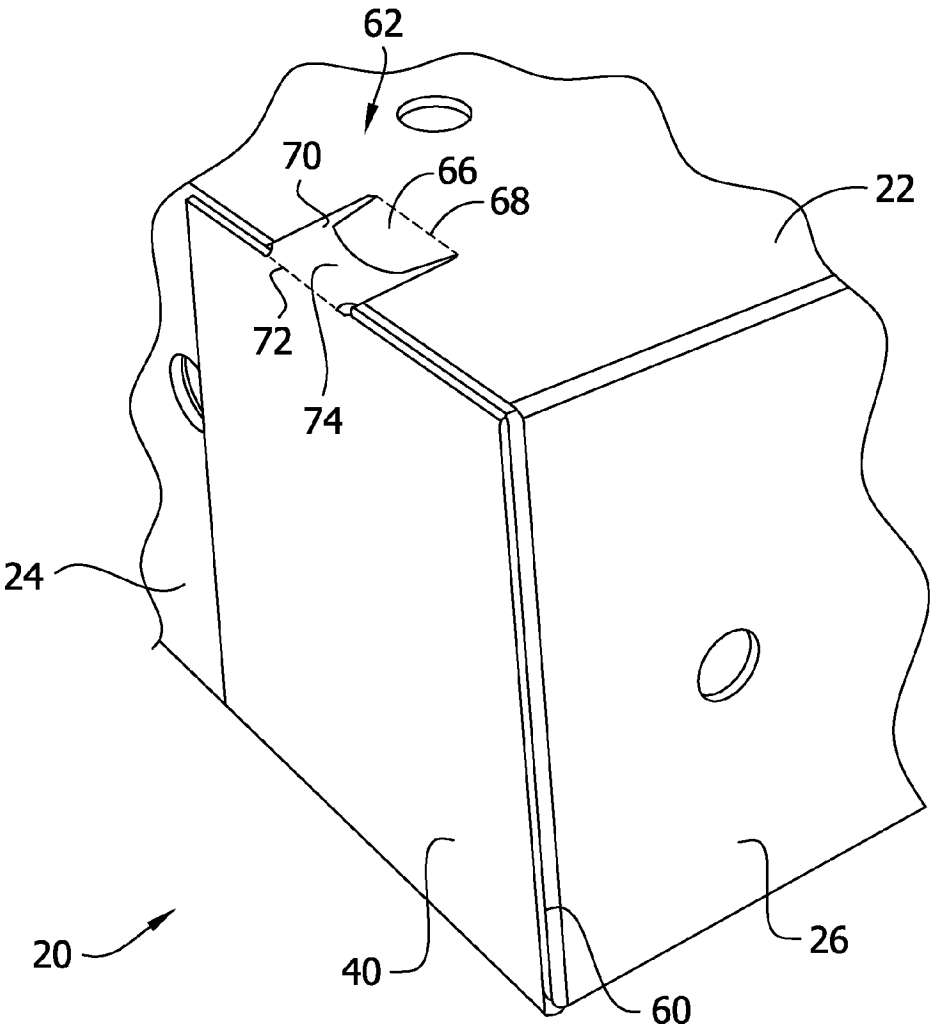
FIG. 5 is the fragmentary, inward-facing, underside perspective view of FIG. 3, with the tab received in the slot.
Figure 6:
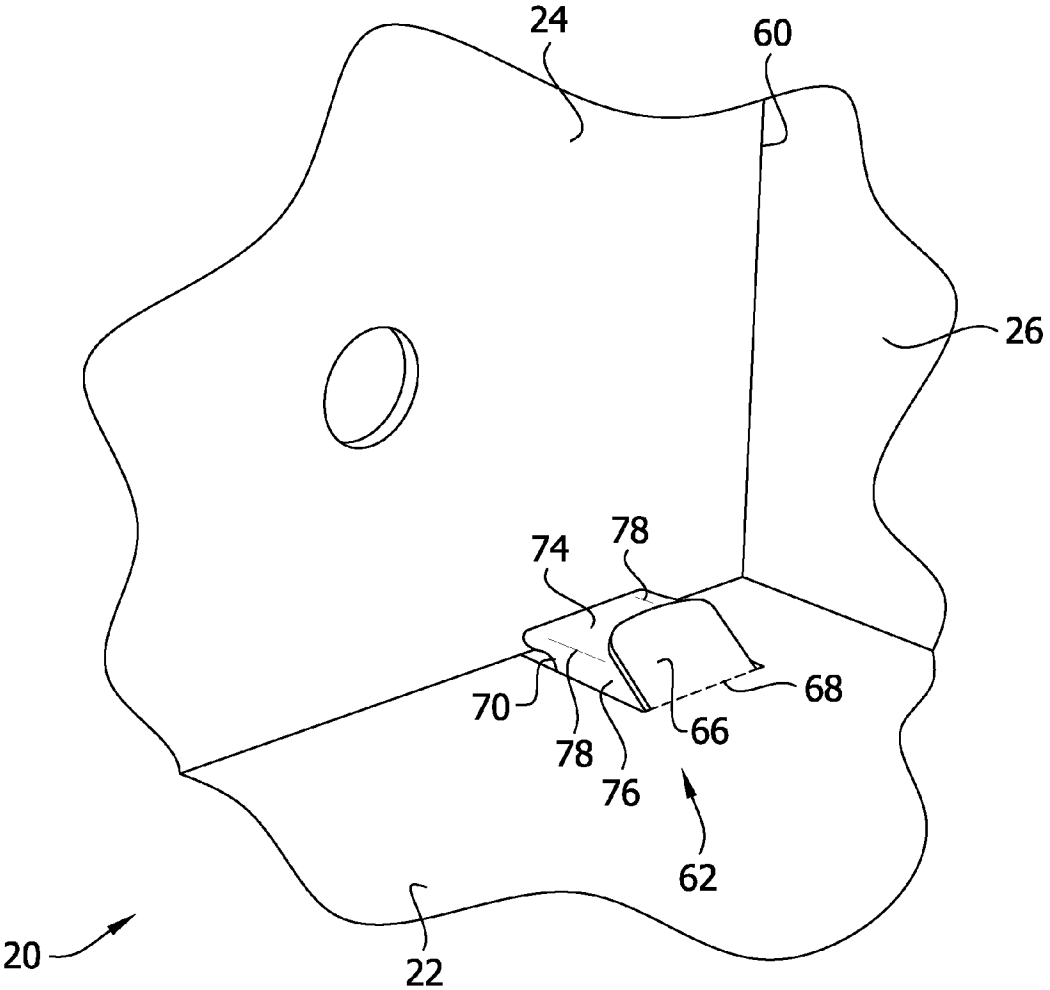
FIG. 6 is a fragmentary, outward-facing, topside perspective view of the locking structure of the box blank in which a portion of a top panel has been removed to reveal the locking structure with the tab being inserted in the slot.

In the illustrated embodiment, the locking structure 62 includes the overlay panel 40, which, as discussed above, is foldably attached (e.g., by way of a top panel 36 (FIG. 2)) to an end panel 26. The overlay panel 40 is configured to be folded toward an overlying position, as shown in FIG. 3, in which the overlay panel overlies a portion of the side panel 24. Suitably, the overlay panel 40 may be configured in the overlying position when the side panel 24 and end panel 26 are secured in their respective orthogonal positions. In addition to the overlay panel 40, the illustrated locking structure 62 includes a slot 64 in the bottom panel 22, a flap 66 foldably attached to the bottom panel at a flap joint 68 and extending into the slot from an inward slot edge, and a tab 70 foldably attached to the overlay panel at a tab joint 72. The tab 70 has a spine 74 and a pair of wings 76 that extend outwardly from the spine. The tab 70 is configured to be folded in along its tab joint 72 and inserted into the slot 64 (FIGS. 4 and 6). The tab 70 is further configured to be lockingly received in the slot 64 (FIGS. 5 and 7) to secure the overlay panel 40 in the overlying position.

As shown best in FIG. 3, the tab 70 has a width $W_T$ and the slot 64 has a width W. Suitably the tab width $W_T$ is larger than the slot width $W_S$ such that, when the tab 70 is received in the slot 64, the wings 76 at least partially engage the bottom panel 22. In the illustrated embodiment the tab width $W_T$ is approximately 30% wider than the slot width W. However, the tab width $W_T$ may be even wider proportionately with respect to the slot width $W_S$ without departing from the scope of the invention. Likewise, the tab width $W_T$ may be narrower proportionately with respect to the slot width $W_S$ without departing from the scope of the invention. The tab 70 also has a tab length $L_T$, the slot 64 has a slot length $L_S$, and the flap 66 has a flap length $L_F$. Suitably, the tab length $L_T$ is greater than the difference between the slot length $L_S$ and the flap length $L_F$ (i.e., the length of the slot into which no portion of the flap extends). As will be discussed in more detail below, when the tab 70 is received in the slot 64, a portion of the spine 74 may overlie a portion of the flap 66.

In the illustrated embodiment, prior to insertion, the tab 70 extends from the overlay panel 40 past the bottom edge of the bottom panel 22. In this configuration, the illustrated tab 70 is generally coplanar with respect to the overlay panel 40. The spine 74 has a longitudinal spine axis SA. The pair of wings 76 extend outward from the spine 74 in opposed directions that are generally transverse to the spine axis SA but coplanar with the overlay panel 40 and the spine. As discussed above, the tab 70 is foldably attached to the overlay panel at a tab joint 72. In the box configuration, the tab joint 72 is oriented substantially in a bottom plane of the blank 20 (i.e., the plane in which the bottom panel 22 lies). Thus, the illustrated tab 70 folds along the tab joint 72 towards an underside of the bottom panel 22 as the tab is being inserted into the slot 64. In the illustrated embodiment, only the tab 70 folds towards the underside of the bottom panel 22. No portion of the overlay panel 40 folds towards the underside of the bottom panel 22. Thus, the only portion of the blank that folds under the bottom panel 22 is configured to be received in the slot 64 such that, in the box configuration, the bottom panel may rest flush against a planar underlying surface.

As shown best in FIGS. 4 and 6, each of the wings 76 is configured to bend away from the bottom panel 22 from a coplanar position with respect to the spine 74 as the tab 70 is being inserted in the slot 64. Unlike dart-type locking structures, the tab 70 of the locking structure 62 is configured to be inserted into the slot 64 with an insertion force applied transverse to the spine axis SA (i.e., the longitudinal axis of the tab). Opposite edges of the slot 64 may apply a normal force against the surface of the tab 70 at bending lines 78. As the tab 70 is folded in along the tab joint 72, the plane of the spine 74 will eventually pass through the plane of the bottom panel 22. When this happens, the wings 76 will bend in away from the bottom panel 22 along bend lines 78 until the outer edges of the wings 76 pass through the plane of the bottom panel 22. As the tab 70 is being inserted into the slot 64, the flap 66 is deflected inward along the flap joint 68. A surface of the spine 74 engages an opposed surface of the flap 68 such that the insertion force applied to the tab 70 is transferred to the flap 66, and the flap 66 bends away from a coplanar position with respect to the bottom panel 22.

Preferably, the tab 70 is formed of material that responds resiliently to the bending along bending lines 78. Each of the wings 76 may be configured to resiliently return toward its respective coplanar position with respect to the spine 74 when the tab 70 is received in the slot 64. As shown best in FIGS. 5 and 7, when the outer edges of the wings 76 pass through the plane of the bottom panel 22, the wings may snap back into a coplanar position with respect to the spine 74. Because the tab width $W_T$ is greater than the slot width $W_S$, the tab 70 is prevented from sliding away from a locked position with respect to the slot 64. The wings 76 are resiliently biased toward a coplanar position with respect to the spine 74. Likewise, the tab 70 is resiliently biased toward a coplanar position with respect to the overlay panel 40. As a result, when the tab 70 is received in the slot 64, it securely engages the bottom panel 22 and locks the tab in place with respect to the slot. The locked-in-place tab 70 is attached to the overlay panel 40 and secures the overlay panel in the overlying position. The overlay panel 40 is resiliently biased toward a coplanar position with respect to the top panel 36, but the side panel-adjacent edges of the tab 70 engage the inner surface of the side panel 24.

In the illustrated embodiment, the tab 70 is configured such that, when received in the slot 64, the side panel-adjacent edges of the tab 70 are oriented substantially parallel to the surface of the side panel 24. In a preferred embodiment, the side panel-adjacent edges of the tab 70 are oriented substantially orthogonal to the longitudinal spine axis SA. The parallel engagement between the tab 70 and side panel 24 provides a strong interlocking structure against forces applied in the direction of the spine axis SA. This feature may be beneficial because, as discussed above, the overlay panel 40 may tend to resiliently return toward a coplanar position with respect to the top panel 36, which in turn will tend to apply a force on the tab 70 in the direction of the spine axis SA. The flush engagement between the tab 70 and the side wall 24 will effectively resist this force. By comparison, a dart-type lock would typically be tapered along panel-adjacent edges so that it can be pulled back through its opening during disassembly. This tapered engagement surface would not provide as effective of a locking structure because of the resilient overlay panel's tendency to apply a force on the tab in the direction of the longitudinal axis of the tab. As discussed above, when each of the overlay panels 40 are secured in the overlying positions, the locking structures 62 securely gird the blank 20 in the box configuration of FIG. 2.

Suitably, the locking structure 62 may be configured such that the flap 66 resiliently returns toward its coplanar position when the tab 70 is received in the slot 64. When the tab 70 is being inserted, the leading edge of the spine 74 may pass over an opposed edge of the flap 66 just before the outer edges of the wings 76 pass through the plane of the bottom panel 22. When the leading edge of the spine 74 passes over the opposed edge of the flap 66, the flap may snap back toward a coplanar position with respect to the bottom panel 22. As discussed above, the tab length $L_T$ is greater than the difference between the slot length $L_S$ and the flap length $L_F$. Thus, in the locked position, the flap 66 provides additional locking support to the tab 70 to prevent it from being pulled back through the slot 64.

Figure 8:
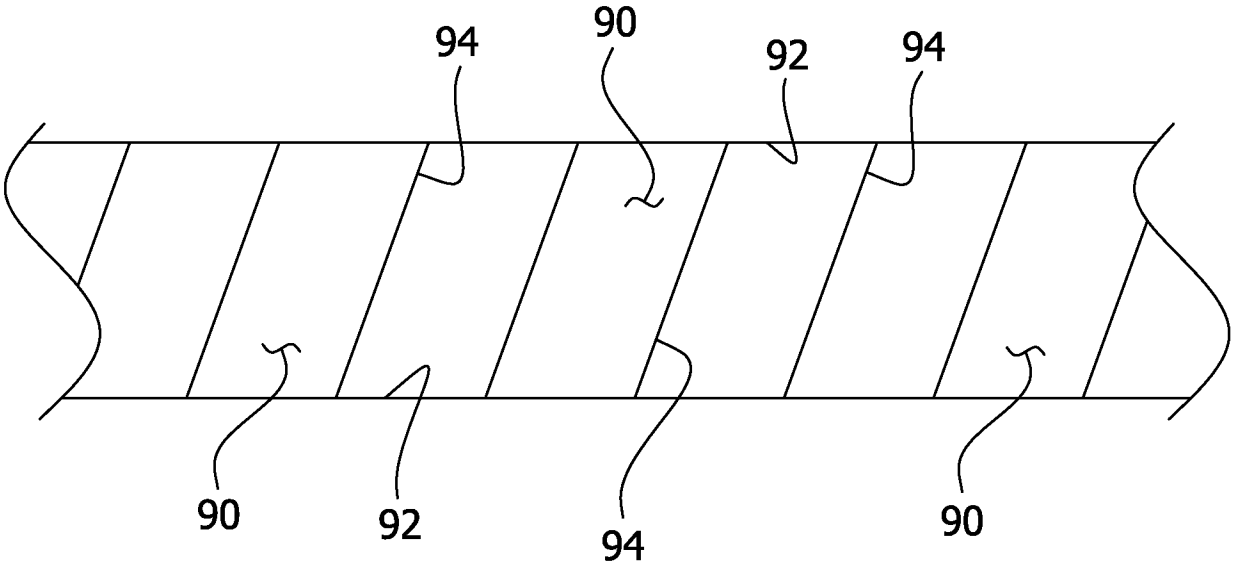
FIG. 8 is a fragmentary side view of an exterior edge the box blank.

As shown best in FIG. 8, the illustrated blank 20 is made of a one-piece slab of fluted material. The blank 20 has a plurality of flutes 90. Each of the flutes 90 has a longitudinal axis, and the longitudinal axes of the plurality of flutes are oriented parallel to one another. Though the illustrated blank 20 is formed from a fluted material, it is contemplated that other materials such as, for example, heavy cardstock, plastic sheeting, metal sheeting, etc. may also be used without departing from the scope of the invention. In the illustrated embodiment, the fluted material blank 20 is made out of plastic. The plastic material can be polyolefins, such as polypropylene (PP), polyethylene (PE), styrene polymers, such as polystyrene (PS), polyesters, such as polyethylene-terephthalate (PET), polycarbonate (PC), acrylics, such as polymethyl methacrylate (PMMA), vinyl polymers, such as polyvinyl chloride (PVC), etc. As illustrated, the blank 20 includes a pair of spaced apart plastic sheets 92 that are held in spaced apart relationship to one another by a plurality of spaced apart plastic ribs 94. The spaced apart ribs 94 define the plurality of flutes 90. It should be understood that the fluted material may depart from strict conformity with the illustrated embodiment without departing from the scope of the invention. For example, corrugated materials may be used to define the flutes in place of the ribs 94. Likewise, one or zero external sheets of material may be used without departing from the scope of the invention.

One exemplary commercially available material that conforms to the illustrated embodiment is Plastic IntePro®, which is sold by the assignee of the present application. IntePro® of the illustrated embodiment is made of either PP or PE. Plastic materials such as Plastic IntePro® may be preferred over non-plastic materials to maximize the reusability of the box blank 20 in certain applications. For example, if the blank 20 is to be used for storing or transporting produce or other organic material, it may be necessary to thoroughly wash the blank prior to reuse. Plastic IntePro® is a robust material that can withstand repeated washings and even certain types of chemical baths. Though plastic materials are suitable for many applications, it is contemplated that other materials may have properties that serve the needs of other applications. Such other materials may be used without departing from the scope of the invention.

Figure 9:
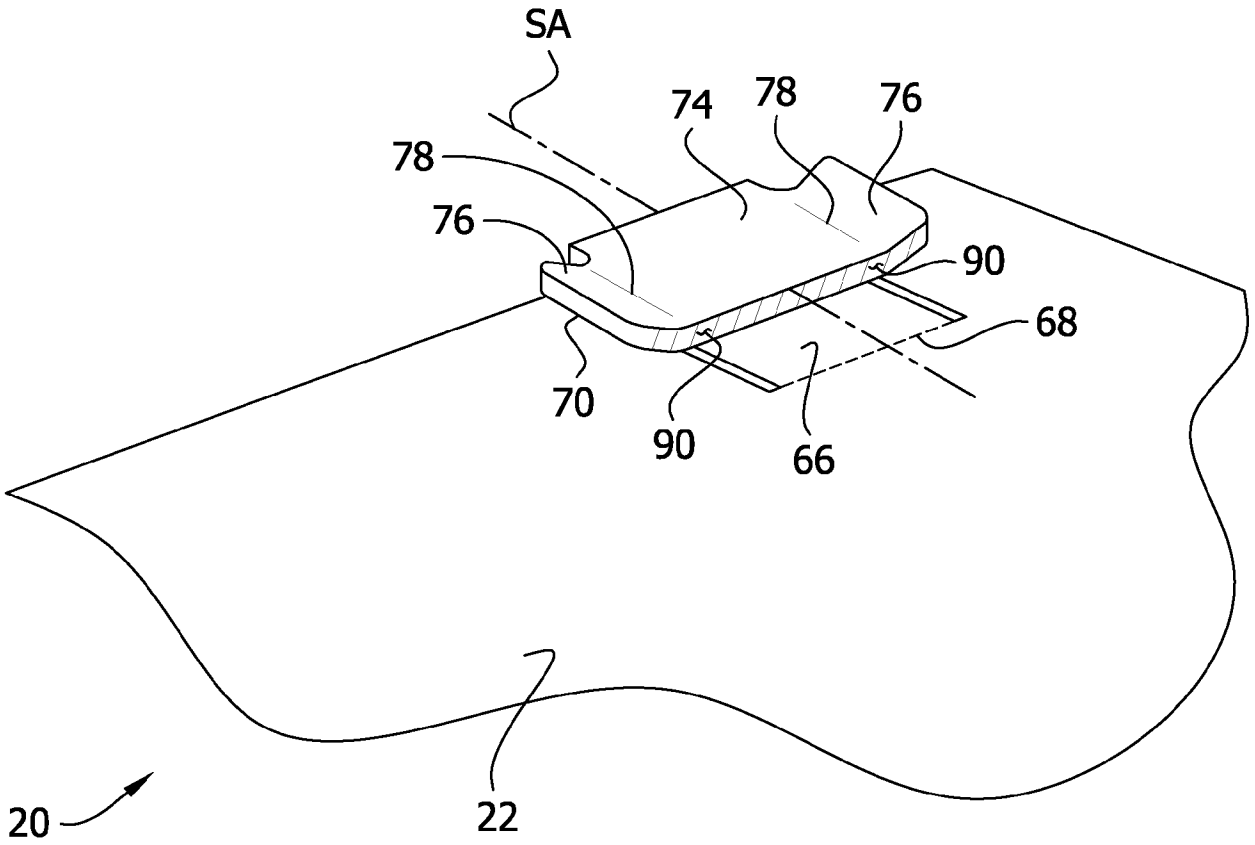
FIG. 9 is a fragmentary, outward-facing, underside perspective view of the locking structure of the box blank, with the tab being inserted in the slot.

In the illustrated embodiment, the flutes 90 may be oriented in operative alignment with the locking structure 62. As shown best in FIG. 9, the longitudinal axis SA of the spine 74 is oriented parallel to the longitudinal axes of the plurality of flutes 90. Each of the wings 76, therefore, bends away from the bottom panel 22 along a respective one of the flutes 90 from the coplanar position with respect to the spine 74 as the tab 70 is being inserted in the slot. In the illustrated embodiment, the longitudinal axes of two of the flutes 90 are respectively aligned with the bending lines 78 for the wings 76. As the tab 70 is inserted into the slot 64, the structure of the blank 20 can collapse around each of the flutes 90 that are in alignment with a bending line 78. As a result, the tab 70 is trained, by way of the material properties of the blank 20, to bend along the bending lines 78 during insertion without any modifications to the blank material. Moreover, because the ribs 94 act like struts between the two plastic sheets 92, the tab is highly resilient to the effects of bending along the bending lines 78. The capacity of the tab 70 to return to its original planar orientation is bolstered by the axial strength of the ribs and is not exclusively dependent on the flexural strength of the sheets 92. Thus, the wings 76 will resiliently return to a coplanar position with respect to the spine 74, even after many instances of insertion and removal. Unlike a dart-type tab, in a preferred embodiment, the tab 70 has a blunt (e.g., flat, non-tapered, non-pointed, etc.) leading edge. The leading edge of the tab 70 may be oriented substantially orthogonal to the longitudinal spine axis SA. Each of the wings 76 defines an opposite side edge of the tab 70. In a preferred embodiment, the side edges of the tab 70 may be oriented substantially orthogonal to the leading edge of the tab and substantially parallel to the spine axis SA. Likewise, in a preferred embodiment, the tab 70 has a substantially uniform width, from its leading edge to its side panel adjacent edge.

Figure 10:
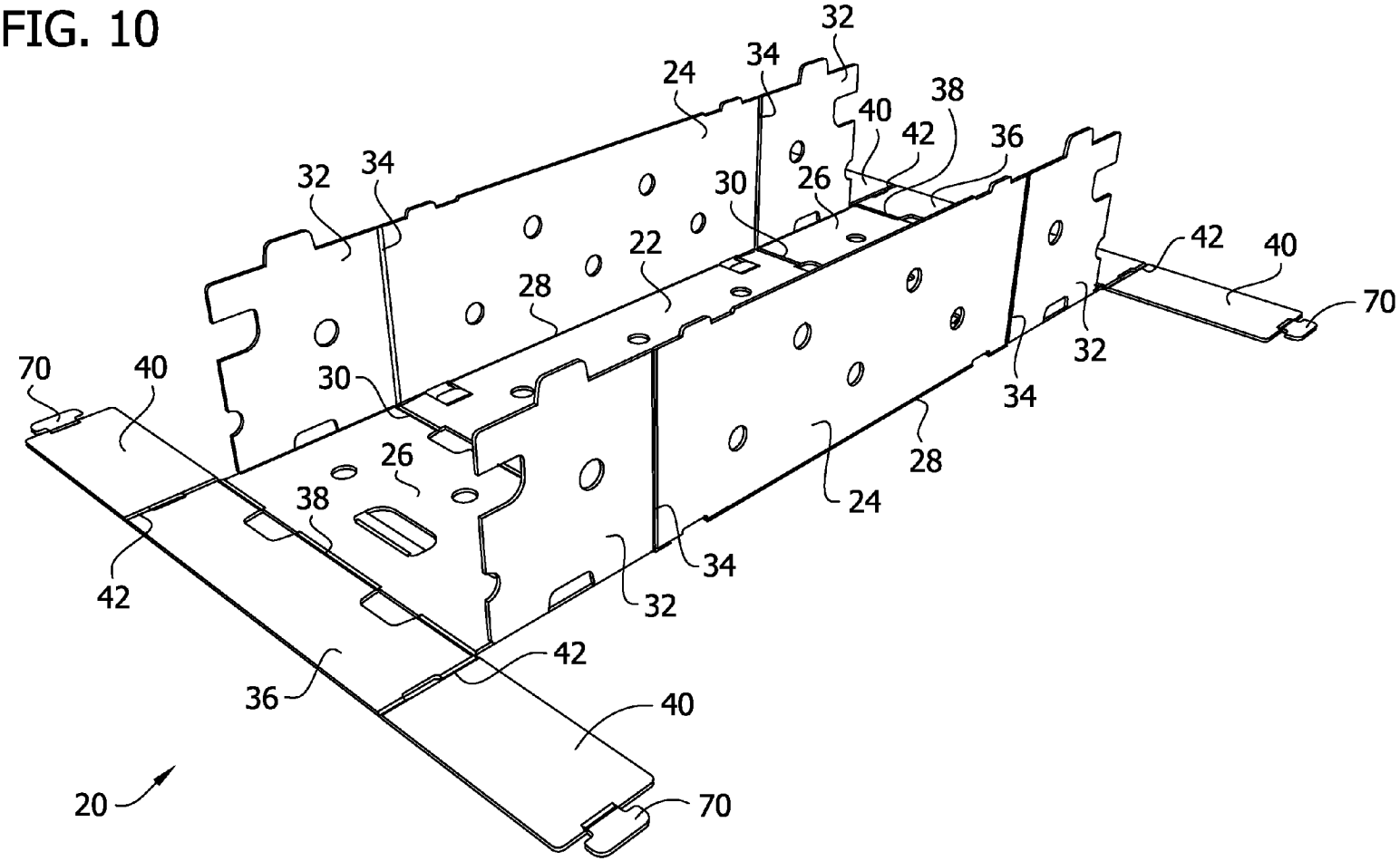
FIG. 10 is the perspective view of FIG. 1, with the box blank configured with the side panels folded up.
Figure 11:
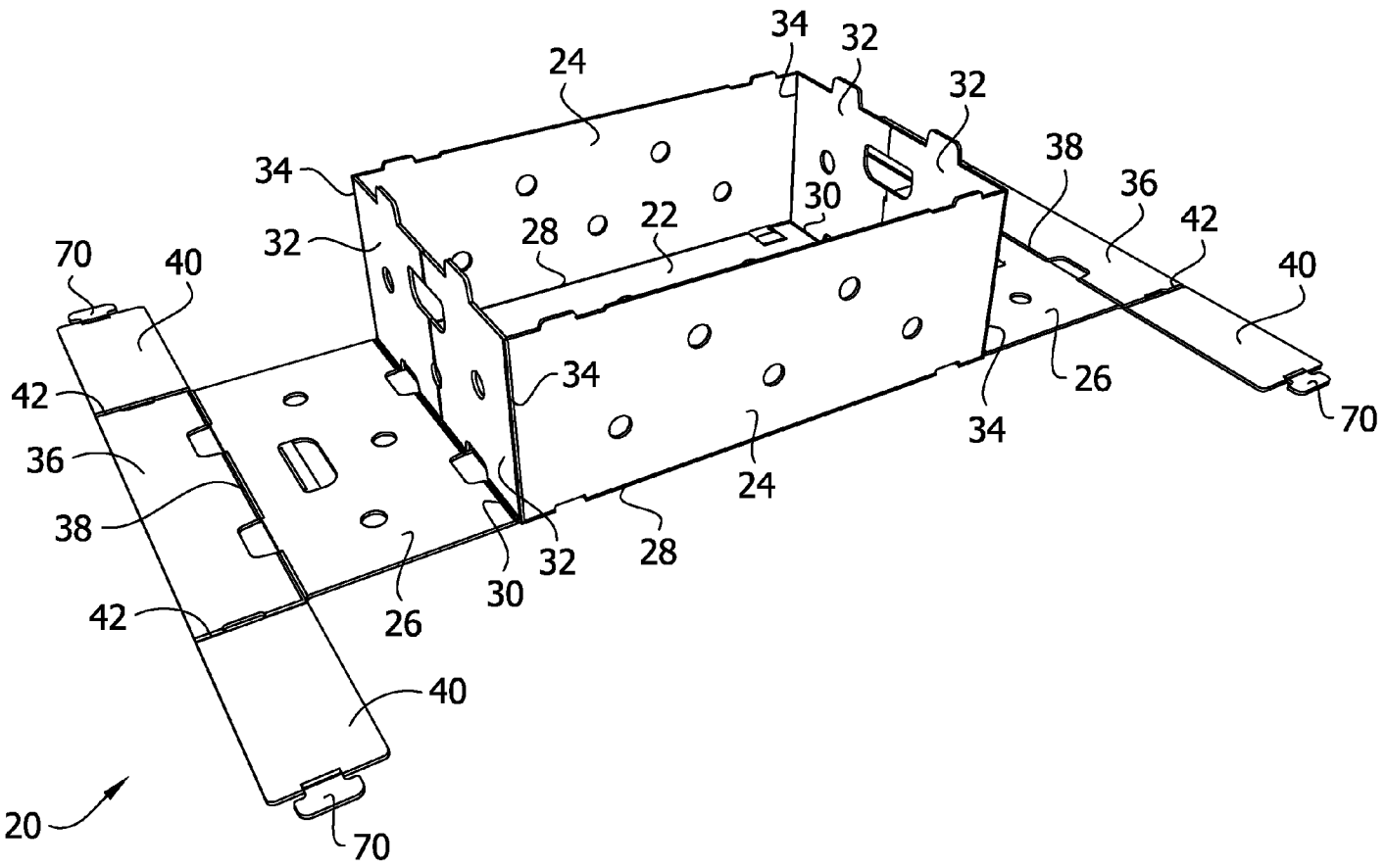

As discussed above, when the blank 20 is in the planar configuration of FIG. 1, it can be easily stored away for later use. In the illustrated embodiment, to assemble the blank 20 into a box configuration, the side panels 24 may first be folded up to an orthogonal position with respect to the bottom panel 22 as shown in FIG. 10. As discussed above, in the illustrated embodiment, the blank 20 is perforated along the bottom side joints 28 so that the side panels 24 can be accurately folded to the proper position. Thus, the blank 20 is folded along the bottom side joints 28 to configure the side panels 24 in their respective orthogonal orientations. As shown in FIG. 11, the corner panels 32 are next folded in from a position coplanar with respective side panels 24 to respective positions orthogonal to the side panels and generally in line with respective bottom end joints 30. When the side panels 24 are properly positioned in their respective orthogonal positions, the bottom edge of the illustrated corner panels 32 will substantially abut the bottom panel 22.

Figure 12:
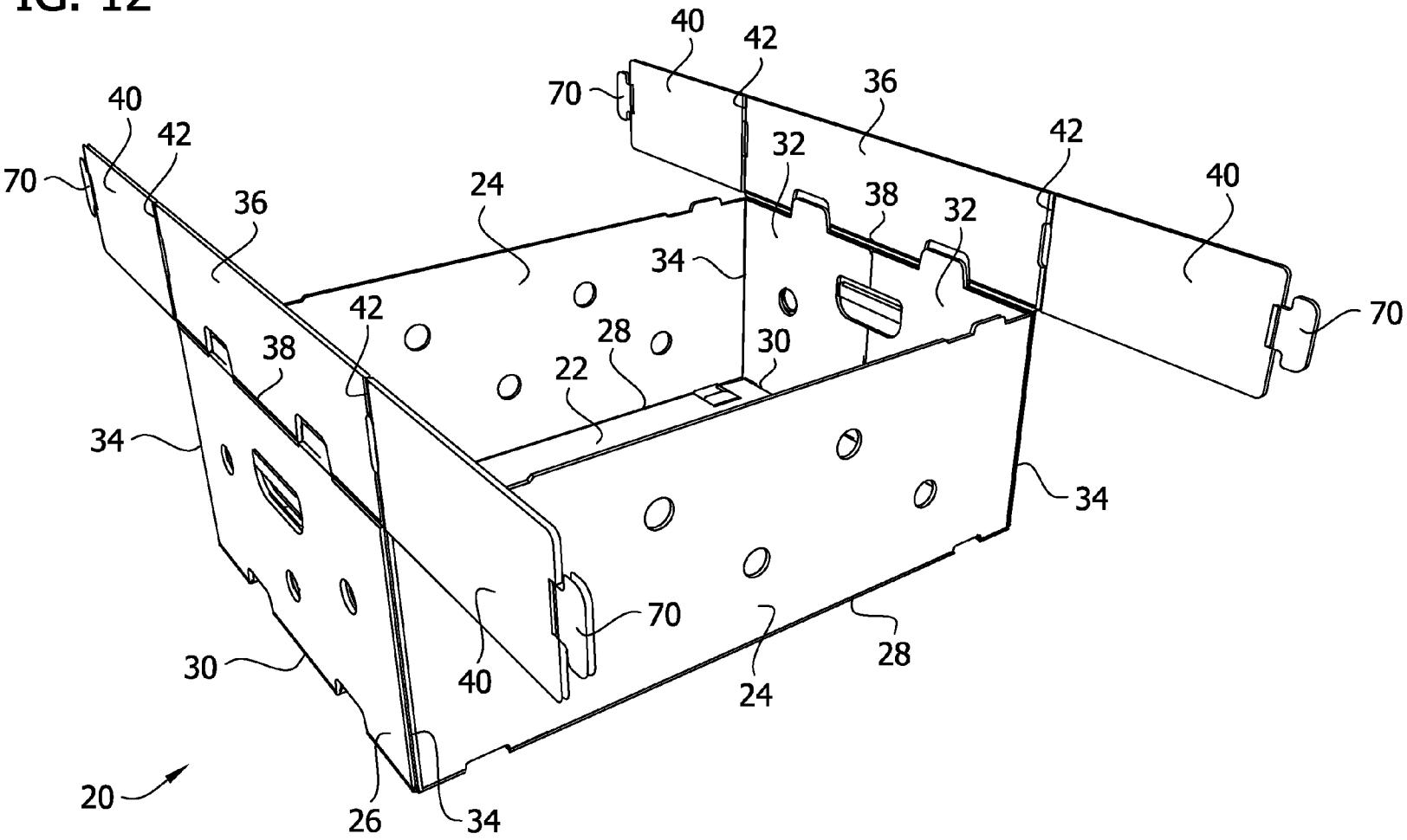
FIG. 12 is the perspective view of FIG. 1, with the box blank configured with the side panels folded up, the corner panels folded in, and the end panels folded up.
Figure 13:
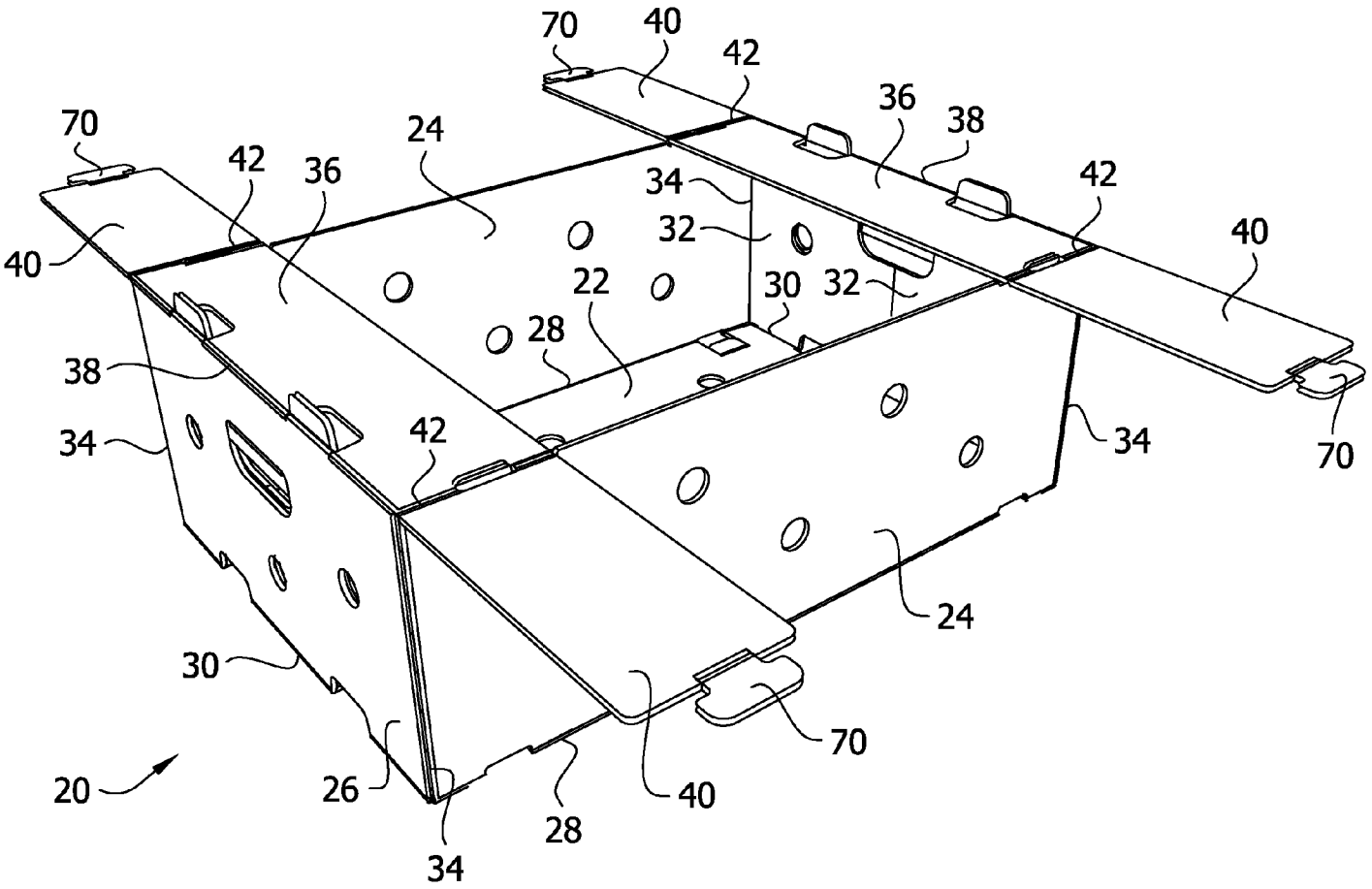
FIG. 13 is the perspective view of FIG. 1, with the box blank configured with the side panels folded up, the corner panels folded in, the end panels folded up, and the top panels folded down.

As shown best in FIG. 12, once the corner panels 32 have been folded in, the blank 20 is folded along the bottom end joints 30. The end panels 26 may be folded up from coplanar positions with respect to the bottom panel 22 to their orthogonal positions. As shown in FIG. 13, the blank 20 is then folded along the top edge joints 38. The top panels 36 are folded down from positions coplanar with the end panels 26 to positions substantially orthogonal to the respective end panels. At this point, much of the blank 20 has been folded into a general box form, but the various panels are not secured in their respective positions.

Figure 7:
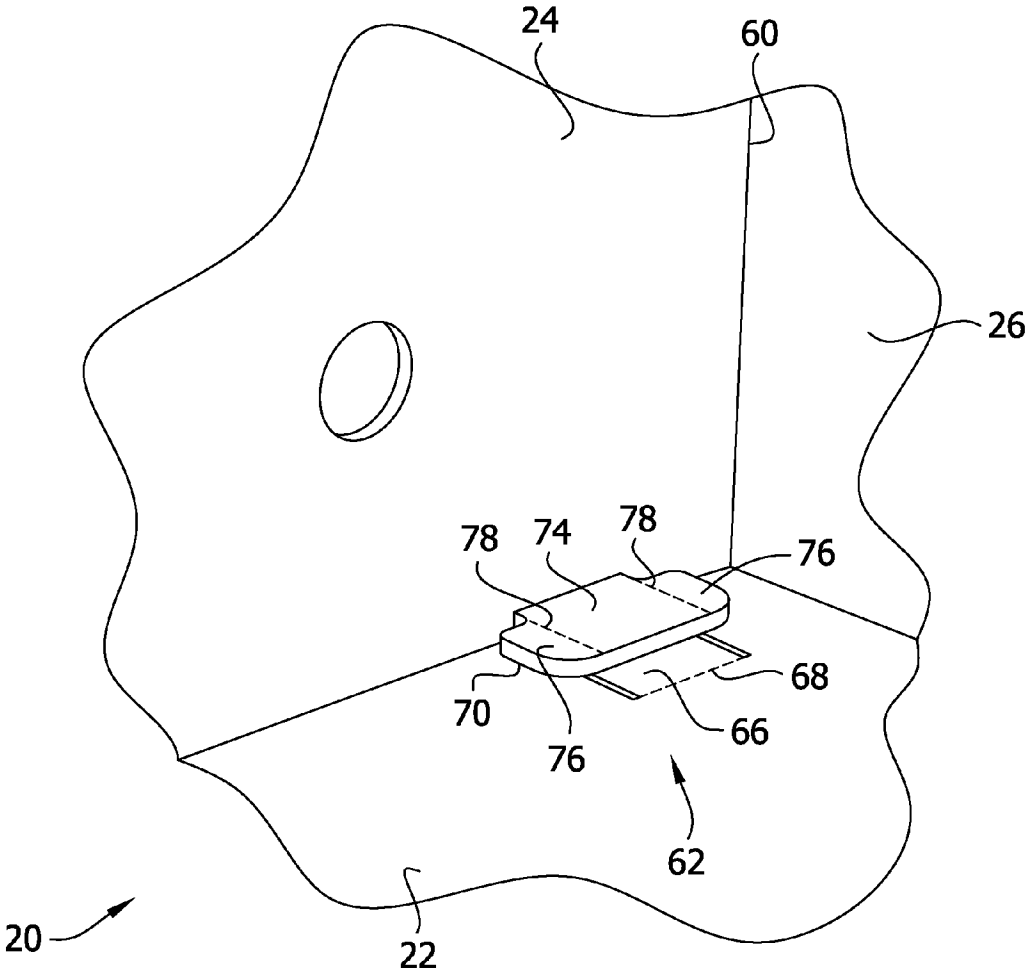
FIG. 7 is the fragmentary, outward-facing, topside perspective view of FIG. 6, with the tab received in the slot.

As shown in FIG. 3, to lock each locking structure 62 and secure the blank in the box configuration, the overlay panel is first folded to an overlying position in which it overlies a portion of the side panel 24. Specifically, the blank 20 is folded along the top overlay joints 42 until the overlay panels 40 overlie the respective portions of the side panels 24 in respective overlying positions. The tab 70 is then inserted into the slot 64 (FIGS. 4 and 6) and is received therein (FIGS. 5 and 7). During insertion, the blank 20 is folded along the tab joint 72 such that the tab 70 rotates toward and past an underside of the bottom panel 22. To insert the tab 70, a force is applied to the tab in a direction transverse to the spine axis SA. As the tab 70 is inserted into the slot 64, each of the wings 76 bends away from the bottom panel 22 from a coplanar position with respect to the spine 74 along a bending line 78. Likewise, the flap 66 is pushed away from a coplanar position with respect to the bottom panel 22. When the leading edge of the spine 74 passes over an opposed edge of the flap 66, the flap resiliently returns toward a coplanar position with respect to the bottom panel 22. When the bent wings 76 pass through the plane of the bottom panel 22, the tab 70 is received in the slot 64, and the wings 76 resiliently return toward the parallel position with respect to the spine 74 such that the tab interlocks with the slot 64 and the bottom panel 22. When each of the four locking structures 62 are secured in a locked configuration, the blank 20 is secured in a box configuration.

When the blank 20 is no longer being used as a box, it may be disassembled from the box configuration and returned to the planar configuration for convenient storage. The tab 70 of each of the locking structures 62 is pushed back through its slot 64. As the tab 70 is being pushed out from the slot 64, the wings bend along bending lines 78 away from a top surface of the bottom panel 22 (i.e., in an opposite direction from the bending during insertion). The flap 66 likewise is pushed down, out of coplanar alignment with the bottom panel 22. The leading edge of the spine 74 passes over the opposed edge of the flap 66, and the flap resiliently returns toward a position coplanar with the bottom panel 22. The wings 76 pass through the plane of the bottom panel 22, and the tab 70 is released from the locked position.

Once each of the locking structures 62 is released from the locked position, the blank 20 can be actively folded toward or allowed to resiliently return toward the planar configuration of FIG. 1. First, the overlay panels 40 are folded toward coplanar positions with respect to the top panels 36 (FIG. 13). The top panels 36 are folded toward coplanar positions with respect to the end panels 26 (FIG. 12). The end panels 26 are folded toward coplanar positions with respect to the bottom panel 22 (FIG. 11). The corner panels 32 are folded toward coplanar positions with respect to the side panels 24 (FIG. 10), and the side panels are folded toward coplanar positions with respect to the bottom panel 22 (FIG. 1). In the planar configuration, the box blank may be placed into convenient storage until the box configuration is needed.

Figure 14:
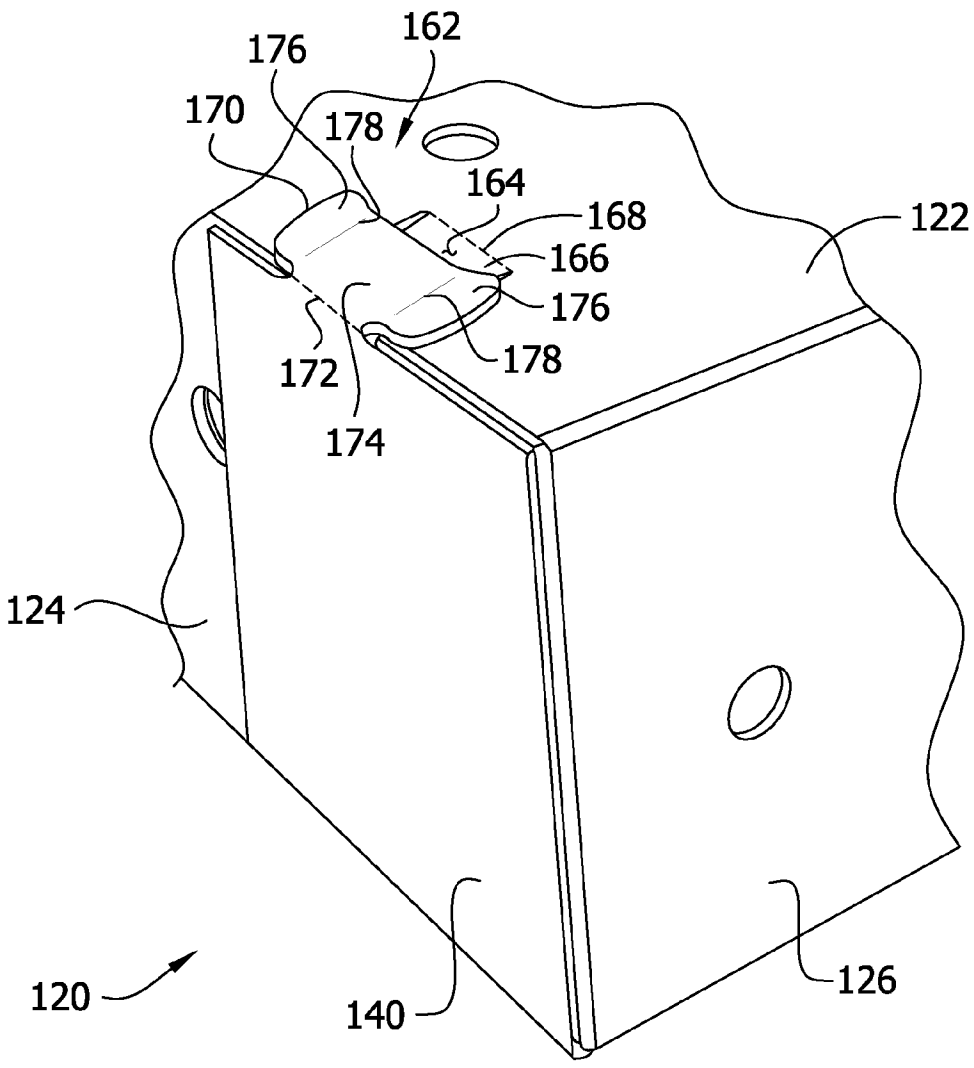
FIG. 14 is a perspective view of an exemplary locking structure for use in securing first and second panels in respective positions with respect to a third panel.

As shown in FIG. 14, a locking structure 162 may be used to secure a first panel 126 and second panel 124 of a box 120 in respective positions (e.g., orthogonal positions) with respect to a third box panel 122. Thus, for example, a locking structure 162 may be used to secure a top panel and a side panel in respective positions with respect to an end panel. Alternatively, as in the embodiment of FIGS. 1-13, a locking structure 162 may be used to secure a side panel and an end panel in respective positions with respect to a bottom panel. Still other panel combinations may also be used with the locking structure 162 without departing from the scope of the invention.

The illustrated locking structure 162 includes an overlay panel 140 foldably attached to a first panel 124 (e.g., by way of an intermediate panel (not shown) foldably attached to the first panel and oriented parallel to the third panel 122). The overlay panel 140 may be configured to be folded toward an overlying position in which the overlay panel overlies a portion of the second panel 126. The locking structure may include a slot 164 in the third panel 122, and a flap 166 foldably attached to the third panel and extending into the slot. A tab 170 may be foldably attached to the overlay panel at a tab joint 172. The tab 172 may be configured to be inserted into the slot 164 and received therein to secure the overlay panel 140 in the overlying position. The tab 170 comprises a spine 174 and a pair of wings 176

The illustrated tab 170 is configured to fold along the tab joint 172 from a position coplanar with the overlay panel 140 as the tab is being inserted into the slot 164. Each of the pair of wings 176 is configured to bend away from the third panel 122 from a coplanar position with respect to the spine 174 as the tab is being inserted into the slot 164. Each of the pair of wings 176 is further configured to resiliently return toward its respective coplanar position when the tab 170 is received in the slot 164. In the illustrated embodiment, when the tab 170 is received in the slot 164, the tab joint 172 is in substantial coplanar alignment with the third panel 122. The operational characteristics of the locking structure 162 substantially conform to the operational characteristics of the locking structure 62 of FIGS. 1-13. It should be understood, that features and capabilities of the locking structure 62 may be incorporated into the locking structure 162 as desired without departing from the scope of the invention. Thus, the locking structure 162 of FIG. 14 may be used like the locking structure 62 of FIGS. 1-13 to secure a first box panel 124 and a second box panel 126 in respective positions with respect to a third box panel 122 without the use of adhesives.

Having described the invention in detail, it will be apparent that modifications and variations are possible without departing from the scope of the invention defined in the appended claims.

When introducing elements of the present invention or the preferred embodiment(s) thereof, the articles "a", "an", "the", and "said" are intended to mean that there are one or more of the elements. The terms "comprising", "including", and "having" are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A blank for being repeatably assembled into a box configuration without the use of adhesives, the blank comprising:

a one-piece slab of fluted plastic material, the slab comprising a plurality of flutes, each of the plurality of flutes having a longitudinal axis, the longitudinal axes of the plurality of flutes oriented parallel to one another, the one-piece slab of fluted material defining at least:

a [bottom ] *first* panel;

a [side] *second* panel foldably attached to the [bottom] *first* panel;

[an end] *a third* panel foldably attached to the [bottom] *first* panel; and a locking structure configured to repeatably secure the [side panel and the end panel] *second panel and the third panel* in respective [orthogonal] positions with respect to the [bottom] *first* panel, the locking structure comprising:

an overlay panel foldably attached to the [end] *third* panel and being configured to be folded toward an overlying position in which the overlay panel overlies a portion of the [side] *second* panel when the [side] *second* panel and the [end] *third* panel are in the respective [orthogonal] positions;

a slot in the [bottom] *first* panel;

[a flap foldably attached to the bottom panel and extending into the slot;] and a tab foldably attached to the overlay panel for being lockingly received in the slot to secure the overlay panel in the overlying position, the tab comprising a spine having a longitudinal axis oriented parallel to the longitudinal axes of the plurality of flutes and a pair of wings extending outwardly from the spine, each of the wings configured to bend away from the bottom panel from a coplanar position with respect to the spine along a respective bending line defined by one of the plurality of flutes as the tab is being inserted in the slot, each of the wings being further configured to resiliently return toward its respective coplanar position when the tab is received in the slot.

2. The blank of claim 1 wherein the one-piece slab comprises a pair of spaced apart sheets held in spaced apart relationship by a plurality of spaced apart ribs, the plurality of spaced apart ribs defining the plurality of flutes.

3. The blank of claim [1] *24 further comprising a flap foldably attached to the third panel and extending into the slot,* wherein the flap bends away from a coplanar position with respect to the [bottom] *first* panel as the tab is being inserted in the slot and resiliently returns toward its coplanar position when the tab is received in the slot.

4. The blank of claim 3 wherein at least a portion of the spine overlies the flap when the tab is received in the slot.

5. The blank of claim 1 [wherein the bottom panel lies in a bottom plane and] wherein the tab is foldably attached to the overlay panel at a tab joint[, the tab joint being oriented substantially in the bottom plane when the blank is assembled into the box configuration] *shaped and arranged* such that the tab folds along the tab joint towards an underside of the [bottom] *first* panel as the tab is being inserted into the slot.

6. The blank of claim 1 wherein the slot has a width and the tab has a width and the width of the tab is at least 30% greater than the width of the slot.

7. The blank of claim 2 wherein each of the ribs extends generally axially between the pair of spaced apart sheets.

8. The blank of claim 7 wherein an axial strength of the ribs defining the flutes that define the bending lines urges the wings to resiliently return toward the coplanar position when the tab is received in the slot.

9. A reusable box secured in a box configuration without the use of adhesives, the box comprising:

a one piece slab of fluted plastic material, the slab comprising a plurality of flutes, each of the plurality of flutes having a longitudinal axis, the longitudinal axes of the plurality of flutes oriented parallel to one another, the one-piece slab of fluted material defining at least:

a bottom panel;

a pair of side panels foldably attached to opposite sides of the bottom panel and oriented in respective [orthogonal] positions with respect to the bottom panel;

a pair of end panels foldably attached to opposite ends of the bottom panel and oriented in respective [orthogonal] positions with respect to the bottom panel, each of the end panels abutting each of the side panels at four respective corners of the box; and a locking structure for each of the four corners of the box, each locking structure securing a respective one of the side panels and a respective one of the end panels in its respective [orthogonal] position with respect to the bottom panel and being configured to be selectively reconfigured for repeatable disassembly and reassembly of the box, each locking structure comprising for said respective one of the side panels and said respective one of the end panels:

an overlay panel foldably attached to said respective one of the end panels in an overlying position in which the overlay panel overlies a portion of said respective one of the side panels;

a slot in the bottom panel;

[a flap foldably attached to the bottom panel and extending into the slot;] and a tab lockingly received in the slot to secure the overlay panel in the overlying position, the tab comprising a spine having a longitudinal axis oriented parallel to the longitudinal axes of the plurality of flutes and a pair of wings extending outwardly from the spine, the tab being configured to be inserted in the slot such that each of the wings bends away from the bottom panel from a coplanar position with respect to the spine along a respective bending line defined by one of the plurality of flutes as the tab is being inserted in the slot, each of the wings being configured to resiliently return toward its respective coplanar position when the tab is received in the slot.

10. The box of claim 9 wherein the one-piece slab comprises a pair of spaced apart sheets held in spaced apart relationship by a plurality of spaced apart ribs, the plurality of spaced apart ribs defining the plurality of flutes.

11. The box of claim [9] *28 further comprising a flap foldably attached to the third panel and extending into the slot,* wherein the flap *of the at least one locking structure* is configured to bend away from a coplanar position with respect to the bottom panel as the tab is being inserted in the slot and to resiliently return toward its coplanar position when the tab is received in the slot.

12. The box of claim 11 wherein at least a portion of the spine *of the at least one locking structure* is configured to overly the flap when the tab is received in the *respective* slot.

13. The box of claim 9 wherein the bottom panel lies in a bottom plane and wherein the tab *of the at least one locking structure* is foldably attached to the *respective* overlay panel at a tab joint, the tab joint being oriented substantially in the bottom plane, the tab *of the at least one locking structure* being configured to fold along the tab joint towards an underside of the bottom panel as the tab is being inserted in the *respective* slot.

14. The box of claim 9 wherein the slot *of the at least one locking structure* has a width and the tab *of the at least one locking structure* has a width, the width of the tab being at least 30% greater than the width of the slot.

15. A locking structure for securing first, second, and third panels of a box in respective [orthogonal] positions with respect to one another without using adhesives, the locking structure comprising:

a one piece slab of fluted plastic material, the slab comprising a plurality of flutes, each of the plurality of flutes having a longitudinal axis, the longitudinal axes of the plurality of flutes oriented parallel to one another, the one-piece slab of fluted material defining at least:

an overlay panel foldably attached to the first panel, the overlay panel being configured to be folded toward an overlying position in which the overlay panel overlies a portion of the second panel;

a slot in the third panel;

[a flap foldably attached to the third panel and extending into the slot;] and a tab foldably attached to the overlay panel at a tab joint, the tab being configured to be inserted in the slot and received therein to secure the overlay panel in the overlying position, the tab comprising a spine having a longitudinal axis oriented parallel to the longitudinal axes of the plurality of flutes and a pair of wings extending outwardly from the spine, the tab being further configured to fold along the tab joint from a position coplanar with the overlay panel as the tab is being inserted in the slot, each of the pair of wings being configured to bend away from the third panel from a coplanar position with respect to the spine along a respective bending line defined by one of the plurality of flutes as the tab is being inserted in the slot, each of the pair of wings being further configured to resiliently return toward its respective coplanar position when the tab is received in the slot;

[wherein, when the tab is received in the slot, the tab joint is in substantial coplanar alignment with the third panel; and]

wherein the tab is configured to be selectively inserted into and removed from the slot to repeatably assemble the first, second, and third panels of the box in the respective [orthogonal] positions.

*16. The locking structure of claim 15 wherein the one-piece slab comprises a pair of spaced apart sheets held in spaced apart relationship by a plurality of spaced apart ribs, the plurality of spaced apart ribs defining the plurality of flutes.*

*17. The locking structure of claim 16 wherein at least one rib adjacent each of the bending lines is configured to urge the respective wing to return toward its respective coplanar position when the tab is received in the slot.*

*18. The locking structure of claim 15 wherein the one piece slab further defines a flap that is foldably attached to the first panel and extends into the slot.*

*19. The locking structure of claim 18 wherein the flap is configured to bend away from a coplanar position with respect to the first panel as the tab is being inserted in the slot and to resiliently return toward its coplanar position when the tab is received in the slot.*

*20. The locking structure of claim 19 wherein at least a portion of the spine overlies the flap when the tab is received in the slot.*

*21. The locking structure of claim 15 wherein the slot has a width and the tab has a width and the width of the tab is at least 30% greater than the width of the slot.*

*22. The locking structure of claim 15 wherein the locking structure is configured to secure the first, second, and third panels of a box in respective orthogonal positions with respect to one another.*

*23. The locking structure of claim 15 wherein the first panel comprises a bottom panel of the box.*

*24. The locking structure of claim 15 wherein when the tab is received in the slot, the tab joint is generally aligned with the third panel.*

*25. The blank of claim 1 wherein the one piece slab further comprises a flap that is foldably attached to the first panel and extends into the slot.*

*26. The blank of claim 1 wherein the locking structure is configured to secure the first, second, and third panels of the box in respective orthogonal positions with respect to one another.*

*27. The blank of claim 1 wherein the first panel comprises a bottom panel of the box.*

*28. The blank of claim 2 wherein at least one rib adjacent each of the bending lines is configured to urge the respective wing to return toward its respective coplanar position after the tab is inserted through the slot.*

*29. The blank of claim 9 wherein at least one locking structure defined by the one piece slab of fluted plastic material further comprises a flap that is foldably attached to the bottom panel and extends into the slot of the at least one locking structure.*

*30. The blank of claim 9 wherein the locking structures are configured to secure the bottom, end, and side panels such that the bottom panel is oriented orthogonal to the end panels and the side panels.*

*31. The blank of claim 10 wherein at least one rib adjacent each of the bending lines of the tab of at least on locking structure is configured to urge the respective wing to return toward its respective coplanar position after the tab is inserted through the respective slot.*

* * * * *